United States Patent
Chen et al.

(10) Patent No.: US 8,011,065 B2
(45) Date of Patent: Sep. 6, 2011

(54) HINGE AND AN ELECTRONIC DEVICE WITH THE HINGE

(75) Inventors: Hsiang-Chi Chen, Shulin (TW); Chia-Hsiang Chen, Shulin (TW); Weiming Chen, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 461 days.

(21) Appl. No.: 12/344,187

(22) Filed: Dec. 24, 2008

(65) Prior Publication Data

US 2010/0154166 A1    Jun. 24, 2010

(51) Int. Cl.
*E05D 3/10* (2006.01)
(52) U.S. Cl. ............... 16/367; 16/242; 16/246; 16/296
(58) Field of Classification Search ............. 63/296, 63/229, 233, 286, 310, 364, 362, 242, 243, 63/246, 291, 282, 287, 288, 294, 302, 366–370, 63/266, 380; 455/575.3; 379/433.13; 361/679.06, 361/679.07, 679.09, 679.27; 16/357, 359, 16/303, 250, 304, 335, 342, 313, 338
See application file for complete search history.

(56) References Cited

U.S. PATENT DOCUMENTS

| | | | | |
|---|---|---|---|---|
| 4,962,567 A * | 10/1990 | Dixon | | 16/319 |
| 5,077,864 A * | 1/1992 | Kawasaki | | 16/278 |
| 6,470,532 B2 * | 10/2002 | Rude | | 16/335 |
| 6,629,336 B2 * | 10/2003 | Hosaka et al. | | 16/327 |
| 6,804,861 B2 * | 10/2004 | Hsu | | 16/366 |
| 7,028,373 B2 * | 4/2006 | Harmon et al. | | 16/284 |
| 7,047,598 B2 * | 5/2006 | Huang | | 16/312 |
| 7,055,219 B2 * | 6/2006 | Shiba | | 16/367 |
| 7,380,314 B2 * | 6/2008 | Hung | | 16/367 |
| 7,469,449 B2 * | 12/2008 | Hsu | | 16/367 |
| 7,607,200 B2 * | 10/2009 | Chang | | 16/303 |
| 7,621,020 B2 * | 11/2009 | Hsu et al. | | 16/340 |
| 7,636,984 B2 * | 12/2009 | Oh | | 16/374 |
| 7,706,137 B2 * | 4/2010 | Iijima et al. | | 361/679.07 |
| 7,752,711 B1 * | 7/2010 | Chen et al. | | 16/347 |
| 2002/0073508 A1 * | 6/2002 | Rude | | 16/341 |
| 2003/0056327 A1 * | 3/2003 | Lin et al. | | 16/342 |
| 2005/0102799 A1 * | 5/2005 | Huang | | 16/367 |
| 2005/0150080 A1 * | 7/2005 | Lu et al. | | 16/367 |
| 2008/0034550 A1 * | 2/2008 | Chang et al. | | 16/367 |
| 2008/0078056 A1 * | 4/2008 | Hsu et al. | | 16/280 |
| 2008/0078061 A1 * | 4/2008 | Hsu et al. | | 16/367 |
| 2008/0196204 A1 * | 8/2008 | Lin et al. | | 16/341 |
| 2008/0263827 A1 * | 10/2008 | Hsu et al. | | 16/362 |
| 2008/0282503 A1 * | 11/2008 | Chen | | 16/342 |

* cited by examiner

*Primary Examiner* — Victor Batson
*Assistant Examiner* — Emily Morgan
(74) *Attorney, Agent, or Firm* — patenttm.us

(57) ABSTRACT

A hinge is mounted between a cover and a base of an electronic device. A lid covers the hinge and is attached securely to the base. The hinge has an arced surface and a rotating shaft. When the cover is pivoted to a certain angle, the rotating shaft abuts the arced surface to lift up the cover so the cover is selectively distant away from the lid. Therefore, the shape of the electronic device does not need to be disfigured and the cover still does not bump against the lid.

20 Claims, 7 Drawing Sheets

HINGE AND AN ELECTRONIC DEVICE WITH THE HINGE

BACKGROUND OF THE INVENTION

1. Field of the Invention

The present invention relates to a hinge and an electronic device with the hinge, especially to the hinge that is mounted between the cover and the base of the electronic device and has a shaft which slides while the cover is pivoted.

2. Description of the Prior Arts

With reference to FIGS. 7 and 8, a conventional electronic device, such as a cell phone and a notebook computer, has a base (90, 90A), a cover (92, 92A), a conventional hinge (91, 91A) and a lid (93, 93A). The conventional hinge (91, 91A) is mounted between the base (90, 90A) and the cover (92, 92A) to allow the cover (92, 92A) pivoting relative to the base (90, 90A). The lid (93, 93A) is mounted on the base (90, 90A) and covers the conventional hinge (91, 91A) to ornament the conventional electronic device.

When the cover (92, 92A) is pivoted relative to the base (90, 90A), the lid (93, 93A) interfere with the end of the cover (92, 92A) to keep the cover (92, 92A) from pivoting. To solve the interference between the cover (92, 92A) and the lid (93, 93A), two conventional ways are shown as follows:

One conventional electronic device is shown in FIG. 7. The end of the lid (93) near the cover (92) has an inclined surface (94). The cover (92) is pivoted along the inclined surface (94) so that the lid (93) does not block the cover (92). However, the inclined surface (94) disfigures the entire appearance of the conventional electronic device.

Another conventional electronic device is shown in FIG. 8. A gap is formed between the cover (92A) and the lid (93A). Therefore, the cover (92A) is kept away from the lid (93A) when the cover (92A) is pivoted. However, the gap not only disfigures the appearance of the conventional electronic device but also increase the volume of the conventional electronic device.

Thus, the conventional ways to solve the interference between the cover (92, 92A) and the lid (93, 93A) disfigure the appearance of the conventional electronic device and increase the volume of the conventional electronic device. To disfigure the appearance of the conventional electronic device and to increase the volume of the conventional electronic device are against the need of the market.

To overcome the shortcomings, the present invention provides a hinge and an electronic device with the hinge to mitigate or obviate the aforementioned problems.

SUMMARY OF THE INVENTION

The main objective of the present invention is to provide a hinge and an electronic device with the hinge that lifts up the cover as desired. The hinge is mounted between a cover and a base of the electronic device. A lid covers the hinge and is attached securely to the base. The hinge has an arced surface and a rotating shaft. When the cover is pivoted to a certain angle, the rotating shaft abuts the arced surface to gradually lift up the cover so the cover is selectively distant away from the lid. Therefore, the shape of the electronic device does not need to be disfigured and the cover still does not bump against the lid.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
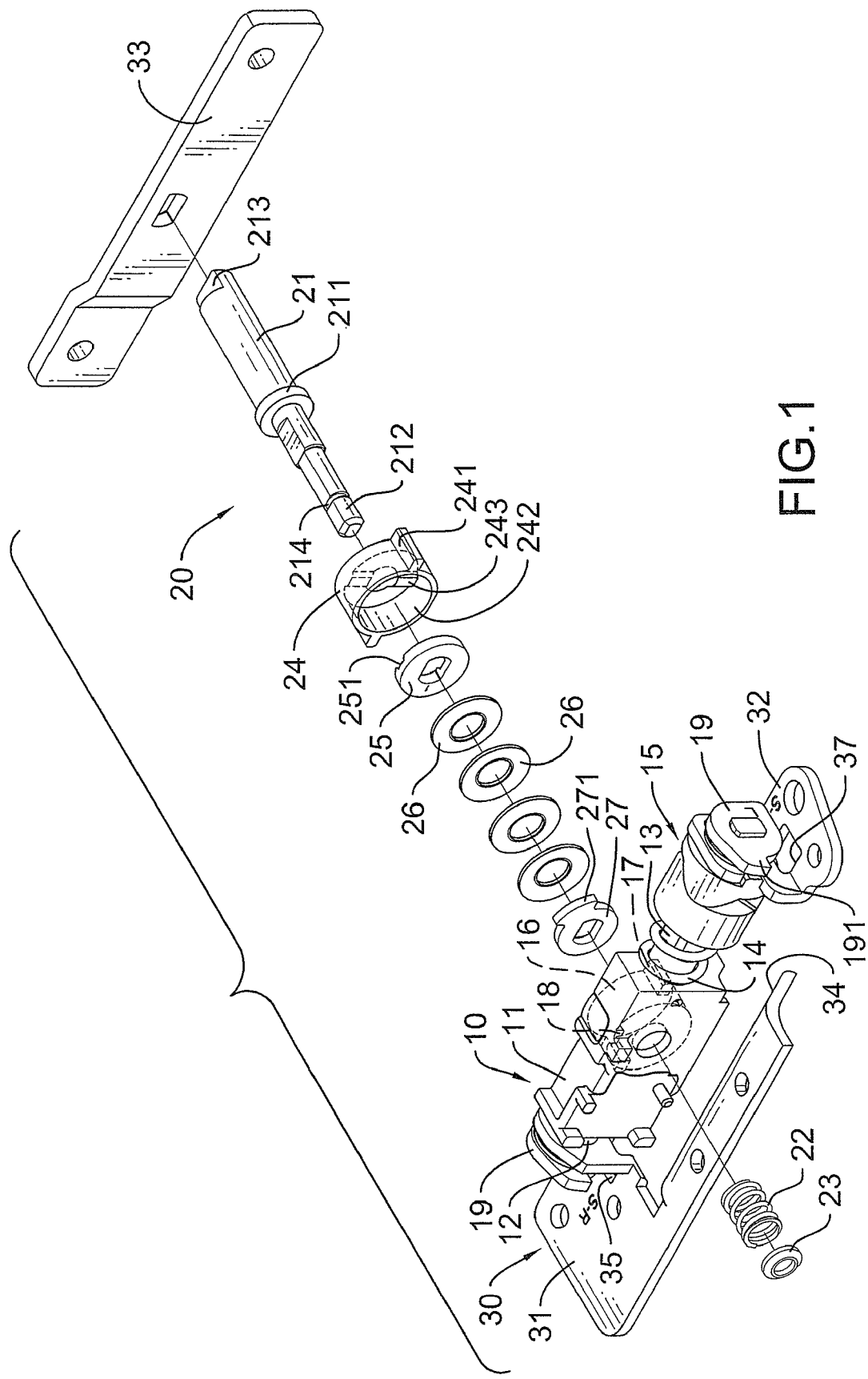
FIG. 1 is a partially exploded perspective view of a hinge in accordance with the present invention.
Figure 2:
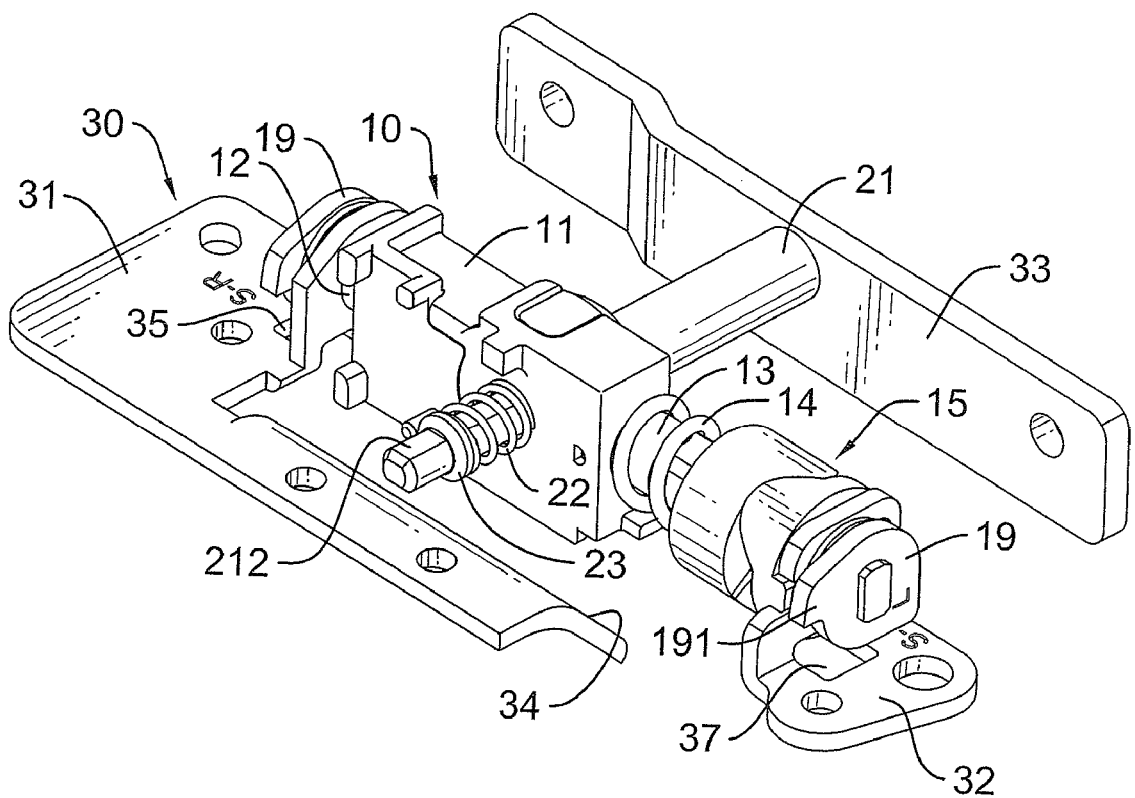
FIG. 2 is a perspective view of the hinge in FIG. 1.

With reference to FIGS. 1 and 2, a hinge in accordance with the present invention comprises a tilting assembly (10), a rotating assembly (20) and a bracket assembly (30).

The tilting assembly (10) comprises a central frame (11), a first tilting shaft (12), a second tilting shaft (13), a spring (14), a positioning assembly (15) and two limiting washers (19).

The central frame (11) has a first wall, a second wall, a first end, a second end, a mounting hole (16), two guiding recesses (17) and a limiting protrusion (18). The second wall is opposite to the first wall and has an inside surface. The second end is opposite to the first end and is adjacent to the first and second walls. The through hole (16) is formed longitudinally through the first and second walls. The mounting hole (16) is formed longitudinally through the first and second walls of the central frame (11). The guiding recesses (17) are formed longitudinally in the first wall and communicate with the mounting hole (16). The limiting protrusion (18) is formed on and protrudes from the inside surface of the second wall.

The first tilting shaft (12) is formed on and protrudes transversely from the first end of the central frame (11) and may be non-circular in cross section.

The second tilting shaft (13) is formed on and protrudes transversely from the second end of the central frame (11) and may be non-circular in cross section.

The spring (14) is mounted around the second tilting shaft (13).

The positioning assembly (15) is mounted around the second titling shaft (13) against the spring (14) to provide positioning function. The positioning assembly (15) may comprise a rotating positioning washer and a stationary positioning washer that rotate relative to each other and have corresponding positioning protrusions and positioning detent.

The limiting washers (19) are respectively mounted securely on the first and second tilting shafts (12, 13). Each limiting washer (19) has an outer edge and a limiting protrusion (191). The limiting protrusion (191) is formed on and protrudes axially from the outer edge of the limiting washer (19).

The rotating assembly (20) is connected to the tilting assembly (10) and comprises a rotating shaft (21), a sleeve (24), a positioning washer (25), multiple resilient washers (26), a limiting ring (27), a resilient element (22) and a fastening ring (23).

The rotating shaft (21) is mounted slidably through the mounting hole (16) of the central frame (11) and has a body, an enlarged head (211), an abutting end (212), a mounting end (213) and an annular recess (214). The body has a non-circular shape in cross section. The enlarged head (211) is formed around the body. The abutting end (212) protrudes out from the second wall of the central frame (11). The mounting end (213) protrudes out from the first wall of the central frame (11). The annular recess (214) is formed annularly in the body near the abutting end (212).

The sleeve (24) is hollow, is mounted rotatably around the rotating shaft (21), is mounted in the mounting hole (16) of the central frame (11) and has a sidewall, a connecting end, a holding wall, a cavity (242), two guiding ears (241) and two positioning protrusions (243). The holding wall is opposite to the connecting end, abuts the enlarged head (211) of the rotating shaft (21) and has an inside surface. The guiding ears (241) are formed transversely on the sidewall of the sleeve (24) and respectively engage the guiding recesses (17) of the central frame (11) to keep the sleeve (24) from rotating relative to the central frame (11). The positioning protrusions (243) are formed on the inside surface of the holding wall of the sleeve (24) and protrude into the cavity (242).

The positioning-washer (25) is slidably mounted around the rotating shaft (21) and has a non-circular central hole configured to match the shape of the rotating shaft (21), an abutting surface and two positioning recesses (251). The abutting surface of the positioning washer (25) faces the inside surface of the holding wall of the sleeve (24). The positioning recesses (251) are formed in the abutting surface of the positioning washer (25) and selectively engage the positioning protrusions (243) of the sleeve (24) to provide positioning function.

The resilient washers (26) are mounted around the rotating shaft (21) and abut the positioning washer (25).

The limiting ring (27) is slidably mounted around the rotating shaft (21) and has a non-circular central hole configured to match the shape of the rotating shaft (21), an annular edge and a limiting protrusion (271). The limiting protrusion (271) is formed transversely on the annular edge of the limiting ring (27) and selectively abuts the limiting protrusion (18) of the central frame (11) to limit the rotating angle of the rotating shaft (21).

The resilient element (22) is mounted around the rotating shaft (21), and abuts the second wall of the central frame (11).

The fastening ring (23) is mounted securely around the rotating shaft (21). The fastening ring (23) is preferably to be fastened on the annular recess (214) of the rotating shaft (21) to hold resilient element (22), and may be a clip.

The bracket assembly (30) is connected to the tilting assembly (10) and the rotating assembly (20) and comprises a first tilting bracket (31), a second tilting bracket (32) and a rotating bracket (33).

The first tilting bracket (31) is mounted rotatably around the first tilting shaft (12) and has an edge, a limiting hole (35) and an extending wing. The limiting hole (35) is formed through the first tilting bracket (31) and selectively receives the limiting protrusion (191) of the corresponding limiting washer (19) to limit the rotating angle of the first tilting bracket (31). The extending wing is formed on and protrudes out from the edge of the first tilting bracket (31), corresponds to the central frame (11) and has an arced surface (34). The arced surface (34) faces the rotating shaft (21) and selectively abuts the abutting end (212) of the rotating shaft (21).

The second tilting bracket (32) is mounted rotatably around the second tilting shaft (13) and has a limiting hole (37). The limiting hole (37) is formed through the second tilting bracket (32) and selectively receives the limiting protrusion (191) of the corresponding limiting washer (19) to limit the rotating angle of the second tilting bracket (32).

The rotating bracket (33) is attached securely to the mounting end (213) of the rotating shaft (21).

Figure 3:
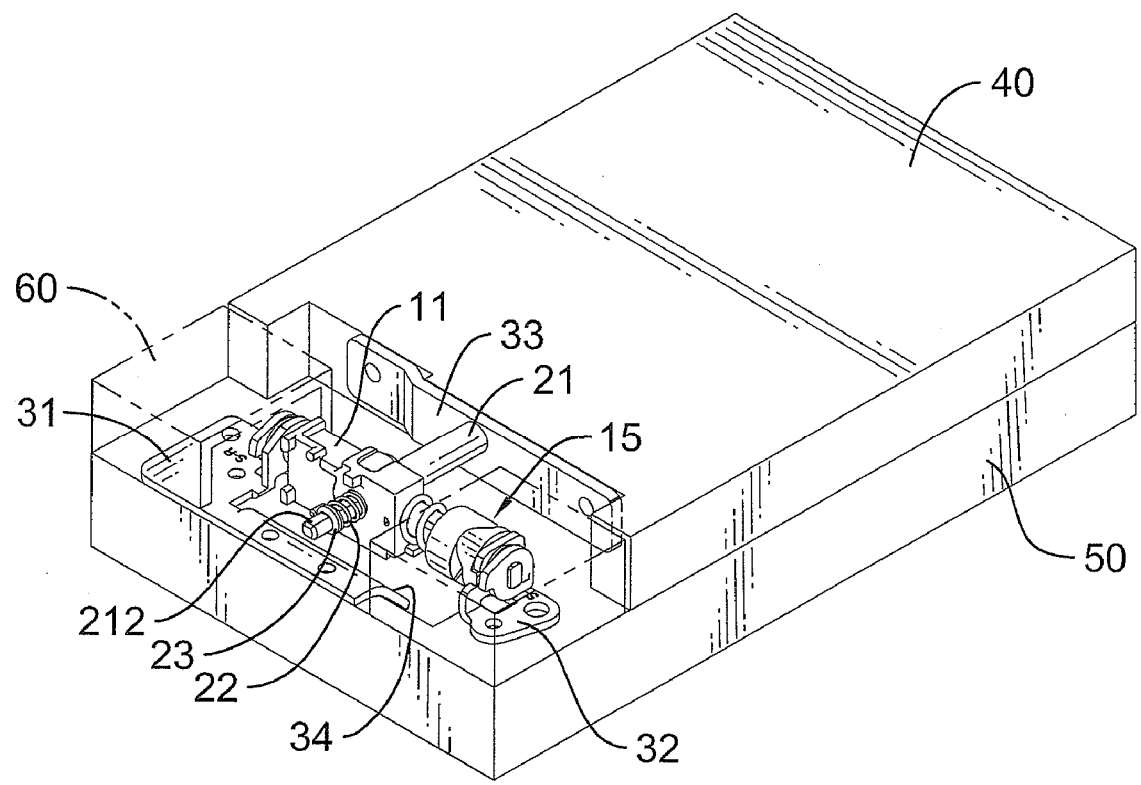
FIG. 3 is a perspective view of an electronic device in accordance with the present invention with the hinge in FIG. 1.
Figure 4:
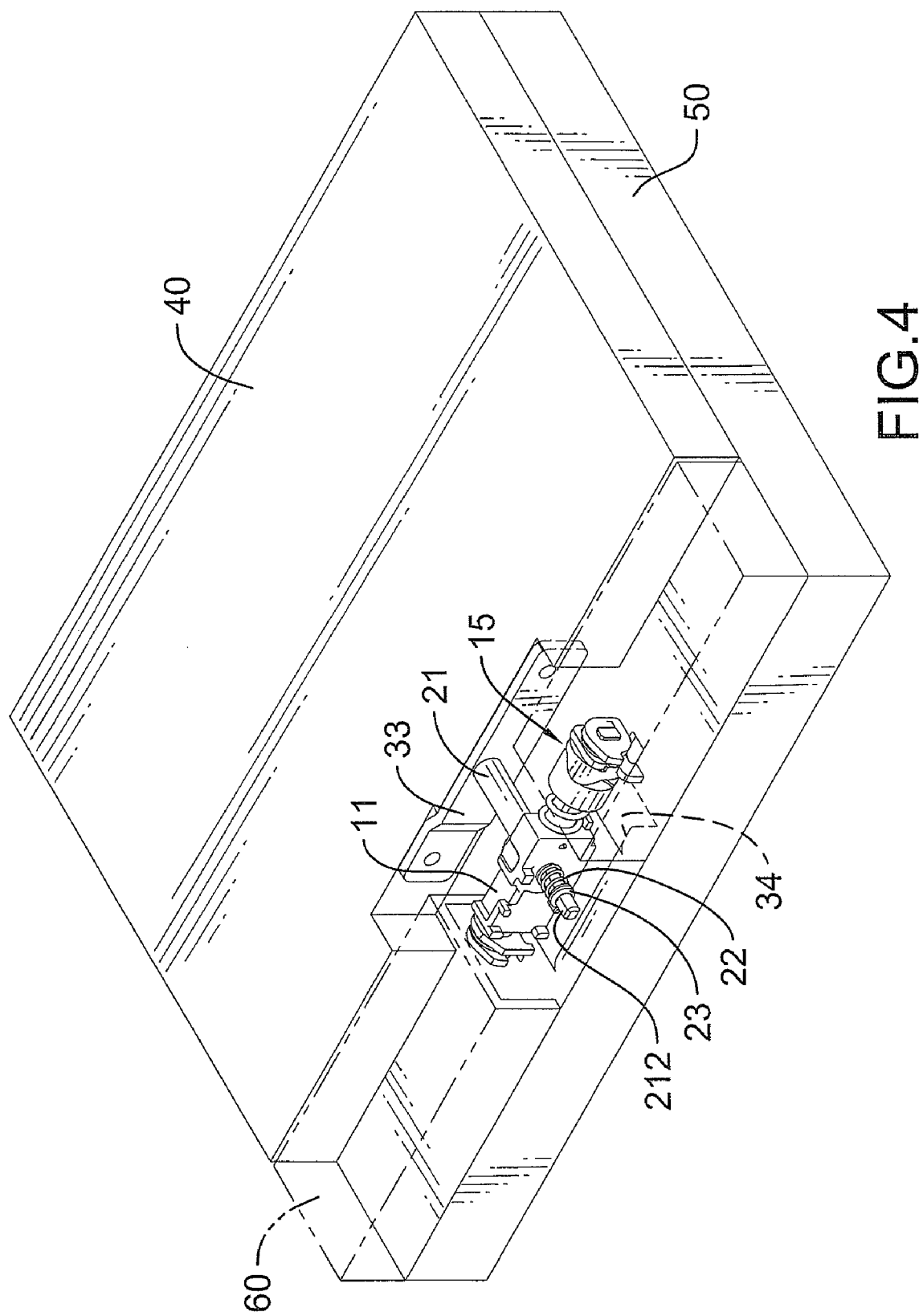
FIG. 4 is a perspective view of another embodiment of an electronic device in accordance with the present invention.
Figure 5:
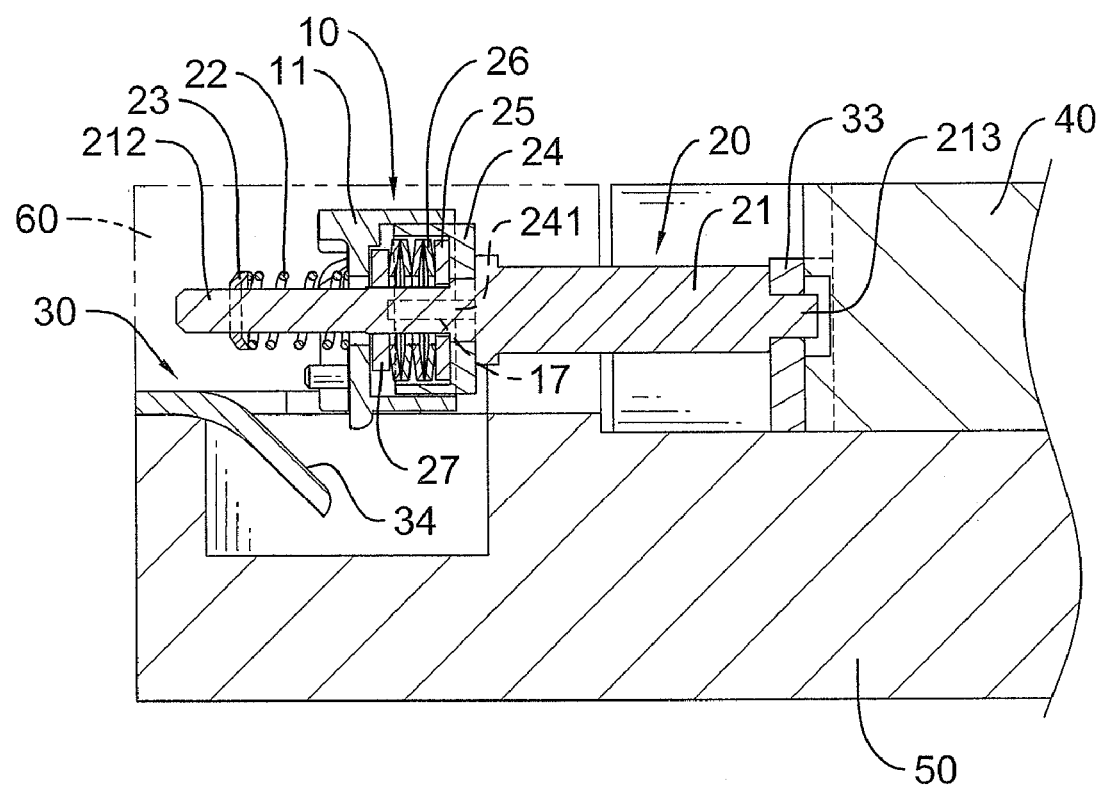
FIG. 5 is an enlarged side view in partial section of the electronic device in FIG. 3.

With further reference to FIGS. 3 to 5, an electronic device in accordance with the present invention comprises a cover (40), a base (50), a hinge as described and a lid (60). The cover (40) is connected pivotally to the base (50). The hinge as described is mounted between the cover (40) and the base (50). The mounted end (213) of the rotating shaft (21) is connected securely to the cover (40) or the rotating bracket (33) may be attached securely to the cover (40). The first and second tilting brackets (31, 32) are attached securely to the base (50). The lid (60) covers the hinge as described and is attached securely to the base (50). The first tilting bracket (31) may be formed on the base (50).

Figure 6A:
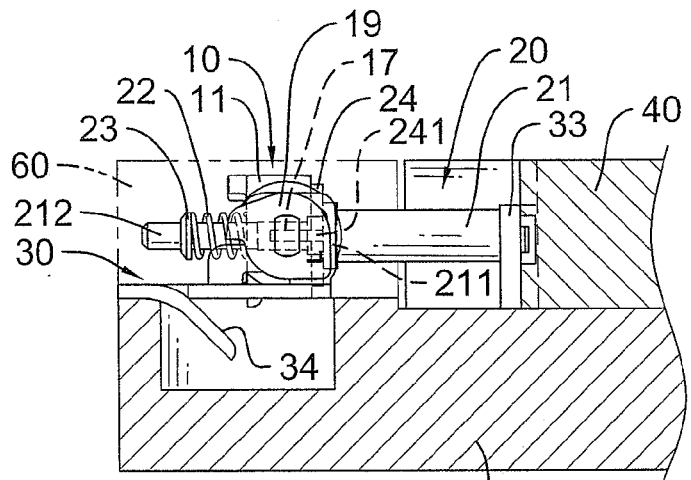
FIGS. 6a, 6b and 6c are operational side views in partial section of the electronic device in FIG. 3.
Figure 6B:
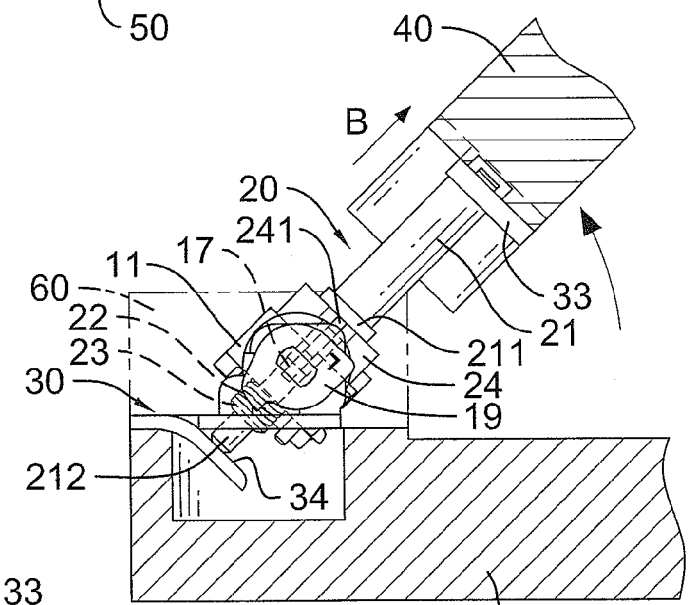
Figure 6C:
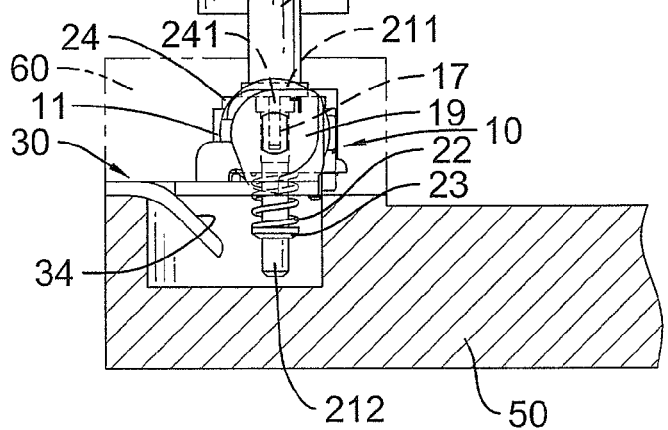
Figure 7:
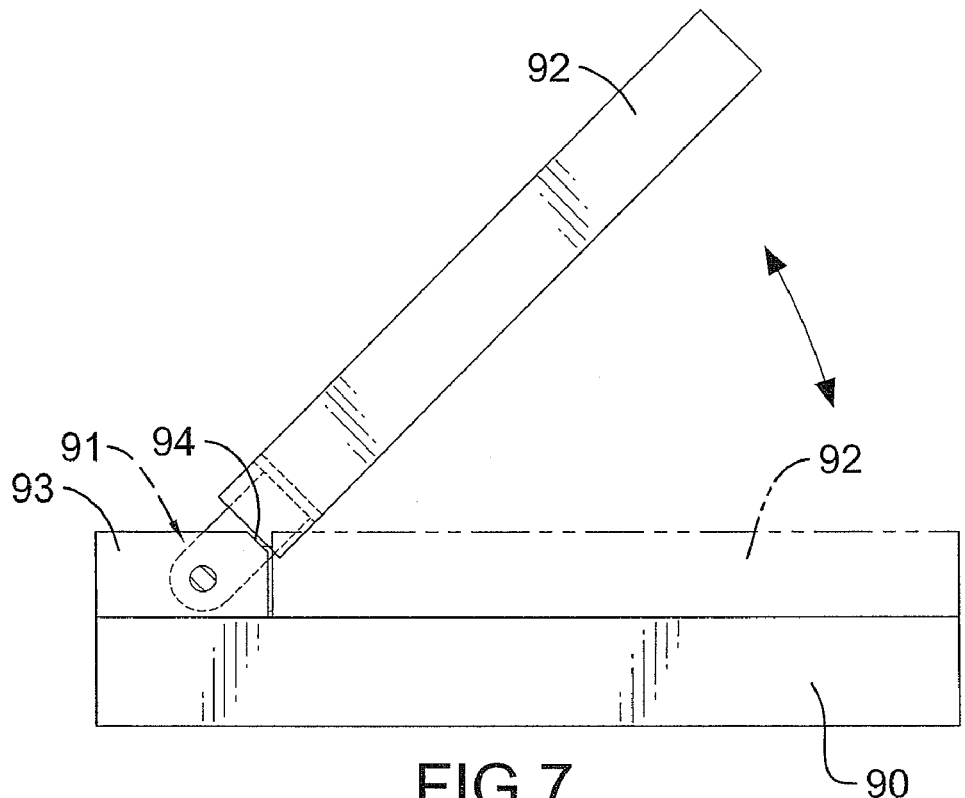
FIG. 7 is an operational side view of a conventional electronic device in accordance with the prior art.
Figure 8:
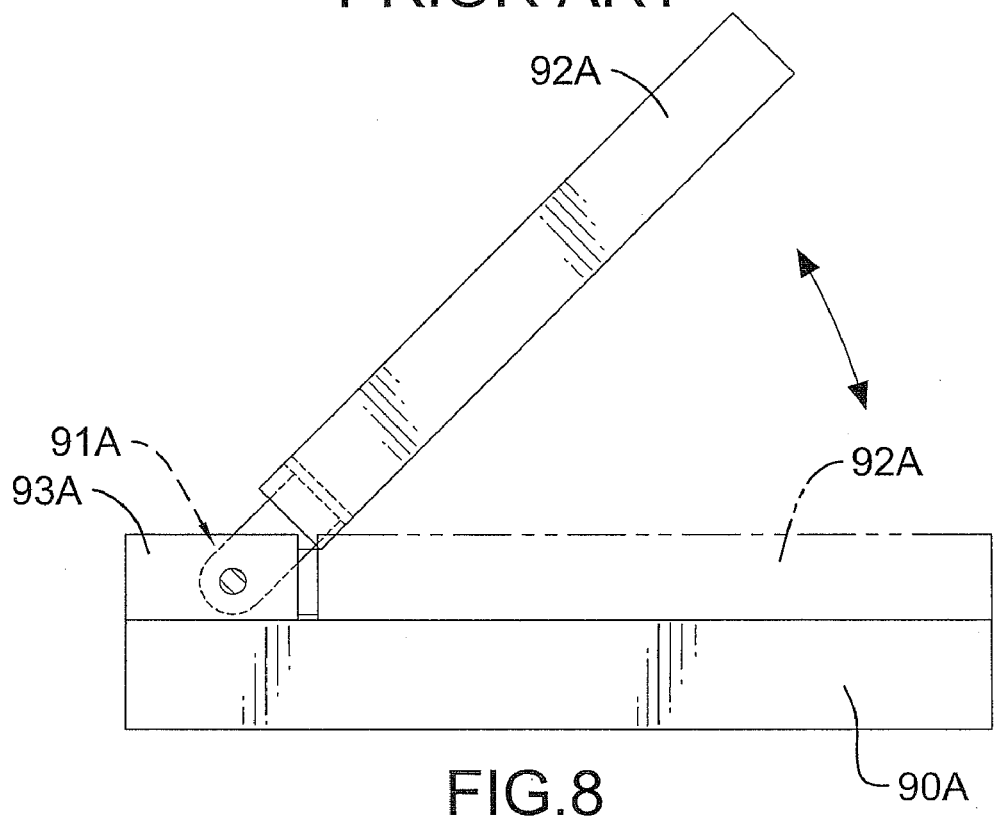
FIG. 8 is an operational side view of another conventional electronic device in accordance with the prior art.

With further reference to FIG. 6, the cover (40) is pivoted relative to the base (50). The cover (40) brings the rotating shaft (21) and the central frame (11) to pivot relative to the first and second tilting brackets (31, 32). When the abutting end (212) of the rotating shaft (21) abuts the arced surface (34), the rotating shaft (21) slides toward B direction as shown in FIG. 6b to gradually lift up the cover (40). Because the cover (40) is lifted up to be distant from the lid (60), the cover (40) does not bump against the lid (60) when the cover (40) is pivoted.

When the rotating shaft (21) slides toward B direction, the resilient element (22) is compressed. When the cover (40) is continuously pivoted, the abutting end (212) of the rotating shaft (21) leaves the arced surface (34) so that the force of the resilient element (22) pushes the fastening ring (23) to pull the rotating shaft (21) to slide to the original position. Therefore, the cover (40) is brought back to the original position.

The hinge and the electronic device as described have following advantages. The hinge smoothly lifts the cover (40) up when the cover (40) is pivoted to a certain angle. Therefore, the shape of the electronic device does not need to be disfigured and the cover (40) still does not bump against the lid (60). Furthermore, the electronic device as described can be sized small and can be shaped exquisitely without influence the smoothness when the cover (40) is pivoted.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
  a tilting assembly comprising
    a central frame having
      a first wall;
      a second wall being opposite to the first wall and having an inside surface;
      a first end;
      a second end being opposite to the first end and being adjacent to the first and second walls; and
      a mounting hole being formed longitudinally through the first and second walls of the central frame;
    a first tilting shaft being formed on and protruding transversely from the first end of the central frame; and
    a second tilting shaft being formed on and protruding transversely from the second end of the central frame;

a rotating assembly being connected to the tilting assembly and comprising
  a rotating shaft being mounted slidably through the mounting hole of the central frame and having
    a body;
    an enlarged head being formed around the body;
    an abutting end protruding out from the second wall of the central frame; and
    a mounting end protruding out from the first wall of the central frame;
  a resilient element being mounted around the rotating shaft and abutting the second wall of the central frame; and
  a fastening ring being mounted securely around the rotating shaft; and
a bracket assembly being connected to the tilting assembly and the rotating assembly and comprising
  a first tilting bracket being mounted rotatably around the first tilting shaft and having
    an edge; and
    an extending wing being formed on and protruding out from the edge of the first tilting bracket, corresponding to the central frame and having an arced surface facing the rotating shaft and selectively abutting the abutting end of the rotating shaft; and
  a second tilting bracket being mounted rotatably around the second tilting shaft.

2. The hinge as claimed in claim 1, wherein
the rotating shaft has an annular recess being formed annularly in the body near the abutting end of the rotating shaft; and
the fastening ring engages the annular recess of the rotating shaft.

3. The hinge as claimed in claim 1, wherein the tilting assembly has
a spring being mounted around the second tilting shaft; and
a positioning assembly is mounted around the second titling shaft against the spring to provide positioning function.

4. The hinge as claimed in claim 2, wherein the tilting assembly has
a spring being mounted around the second tilting shaft; and
a positioning assembly is mounted around the second titling shaft against the spring to provide positioning function.

5. The hinge as claimed in claim 1, wherein
the tilting assembly has two limiting washers being respectively mounted securely on the first and second tilting shafts, and each limiting washer having
  an outer edge; and
  a limiting protrusion being formed on and protruding axially from the outer edge of the limiting washer;
the first tilting bracket has a limiting hole being formed through the first tilting bracket and selectively receiving the limiting protrusion of a corresponding limiting washer; and
the second tilting bracket has a limiting hole being formed through the second tilting bracket and selectively receiving the limiting protrusion of a corresponding limiting washer.

6. The hinge as claimed in claim 4, wherein
the tilting assembly has two limiting washers being respectively mounted securely on the first and second tilting shafts, and each limiting washer having
  an outer edge; and
  a limiting protrusion being formed on and protruding axially from the outer edge of the limiting washer;
the first tilting bracket has a limiting hole being formed through the first tilting bracket and selectively receiving the limiting protrusion of a corresponding limiting washer; and
the second tilting bracket has a limiting hole being formed through the second tilting bracket and selectively receiving the limiting protrusion of a corresponding limiting washer.

7. The hinge as claimed in claim 1, wherein the bracket assembly has a rotating bracket being attached securely to the mounting end of the rotating shaft.

8. The hinge as claimed in claim 6, wherein the bracket assembly has a rotating bracket being attached securely to the mounting end of the rotating shaft.

9. The hinge as claimed in claim 1, wherein
the central frame of the tilting assembly has
  two guiding recesses being formed longitudinally in the first wall and communicating with the mounting hole of the central frame; and
  a limiting protrusion being formed on and protruding from the inside surface of the second wall of the central frame; and
the rotating assembly has
  a sleeve being hollow, being mounted rotatably around the rotating shaft, being mounted in the mounting hole of the central frame and having
    a sidewall;
    a connecting end;
    a holding wall being opposite to the connecting end, abutting the enlarged head of the rotating shaft and having an inside surface;
    a cavity;
    two guiding ears being formed transversely on the sidewall of the sleeve and respectively engaging the guiding recesses of the central frame; and
    two positioning protrusions being formed on the inside surface of the holding wall of the sleeve and protruding into the cavity;
  a positioning washer being mounted around the rotating shaft and having
    an abutting surface facing the inside surface of the holding wall of the sleeve; and
    two positioning recesses being formed in the abutting surface of the positioning washer and selectively engaging the positioning protrusions of the sleeve;
  multiple resilient washers being mounted around the rotating shaft and abutting the positioning washer; and
  a limiting ring being mounted around the rotating shaft and having
    an annular edge; and
    a limiting protrusion being formed transversely on the annular edge of the limiting ring and selectively abutting the limiting protrusion of the central frame.

10. The hinge as claimed in claim 8, wherein
the central frame of the tilting assembly has
  two guiding recesses being formed longitudinally in the first wall and communicating with the mounting hole of the central frame; and
  a limiting protrusion being formed on and protruding from the inside surface of the second wall of the central frame; and
the rotating assembly has
  a sleeve being hollow, being mounted rotatably around the rotating shaft, being mounted in the mounting hole of the central frame and having a sidewall;
a connecting end;
a holding wall being opposite to the connecting end, abutting the enlarged head of the rotating shaft and having an inside surface;
a cavity;
two guiding ears being formed transversely on the sidewall of the sleeve and respectively engaging the guiding recesses of the central frame; and
two positioning protrusions being formed on the inside surface of the holding wall of the sleeve and protruding into the cavity;
a positioning washer being mounted around the rotating shaft and having
an abutting surface facing the inside surface of the holding wall of the sleeve; and
two positioning recesses being formed in the abutting surface of the positioning washer and selectively engaging the positioning protrusions of the sleeve;
multiple resilient washers being mounted around the rotating shaft and abutting the positioning washer; and
a limiting ring being mounted around the rotating shaft and having
an annular edge; and
a limiting protrusion being formed transversely on the annular edge of the limiting ring and selectively abutting the limiting protrusion of the central frame.

11. An electronic device comprising:
a base;
a cover being connected pivotally to the base;
a hinge being connected between the base and the cover and comprising
a tilting assembly comprising
a central frame having
a first wall;
a second wall being opposite to the first wall and having an inside surface;
a first end;
a second end being opposite to the first end and being adjacent to the first and second walls; and
a mounting hole being formed longitudinally through the first and second walls of the central frame;
a first tilting shaft being formed on and protruding transversely from the first end of the central frame; and
a second tilting shaft being formed on and protruding transversely from the second end of the central frame;
a rotating assembly being connected to the tilting assembly and comprising
a rotating shaft being mounted slidably through the mounting hole of the central frame and having
a body;
an enlarged head being formed around the body;
an abutting end protruding out from the second wall of the central frame; and
a mounting end protruding out from the first wall of the central frame and being connected securely to the cover;
a resilient element being mounted around the rotating shaft and abutting the second wall of the central frame; and
a fastening ring being mounted securely around the rotating shaft; and a bracket assembly being connected to the tilting assembly and the rotating assembly and comprising
a first tilting bracket being formed on the base, being mounted rotatably around the first tilting shaft and having
an edge; and
an extending wing being formed on and protruding out from the edge of the first tilting bracket, corresponding to the central frame and having an arced surface facing the rotating shaft and selectively abutting the abutting end of the rotating shaft; and
a second tilting bracket being mounted rotatably around the second tilting shaft; and
a lid covering the hinge and being attached securely to the base.

12. The electronic device as claimed in claim 11, wherein the rotating shaft has an annular recess being formed annularly in the body near the abutting end of the rotating shaft; and
the fastening ring engages the annular recess of the rotating shaft.

13. The electronic device as claimed in claim 11, wherein the tilting assembly has
a spring being mounted around the second tilting shaft; and
a positioning assembly is mounted around the second titling shaft against the spring to provide positioning function.

14. The electronic device as claimed in claim 12, wherein the tilting assembly has
a spring being mounted around the second tilting shaft; and
a positioning assembly is mounted around the second titling shaft against the spring to provide positioning function.

15. The electronic device as claimed in claim 11, wherein the tilting assembly has two limiting washers being respectively mounted securely on the first and second tilting shafts, and each limiting washer having
an outer edge; and
a limiting protrusion being formed on and protruding axially from the outer edge of the limiting washer;
the first tilting bracket has a limiting hole being formed through the first tilting bracket and selectively receiving the limiting protrusion of a corresponding limiting washer; and
the second tilting bracket has a limiting hole being formed through the second tilting bracket and selectively receiving the limiting protrusion of a corresponding limiting washer.

16. The electronic device as claimed in claim 14, wherein the tilting assembly has two limiting washers being respectively mounted securely on the first and second tilting shafts, and each limiting washer having
an outer edge; and
a limiting protrusion being formed on and protruding axially from the outer edge of the limiting washer;
the first tilting bracket has a limiting hole being formed through the first tilting bracket and selectively receiving the limiting protrusion of a corresponding limiting washer; and
the second tilting bracket has a limiting hole being formed through the second tilting bracket and selectively receiving the limiting protrusion of a corresponding limiting washer.

17. The electronic device as claimed in claim 11, wherein the bracket assembly has a rotating bracket being attached securely to the mounting end of the rotating shaft and being attached securely to the cover.

18. The electronic device as claimed in claim 16, wherein the bracket assembly has a rotating bracket being attached securely to the mounting end of the rotating shaft and being attached securely to the cover.

19. The electronic device as claimed in claim 11, wherein the central frame of the tilting assembly has
    two guiding recesses being formed longitudinally in the first wall and communicating with the mounting hole of the central frame; and
    a limiting protrusion being formed on and protruding from the inside surface of the second wall of the central frame; and
the rotating assembly has
    a sleeve being hollow, being mounted rotatably around the rotating shaft, being mounted in the mounting hole of the central frame and having
        a sidewall;
        a connecting end;
        a holding wall being opposite to the connecting end, abutting the enlarged head of the rotating shaft and having an inside surface;
        a cavity;
        two guiding ears being formed transversely on the sidewall of the sleeve and respectively engaging the guiding recesses of the central frame; and
        two positioning protrusions being formed on the inside surface of the holding wall of the sleeve and protruding into the cavity;
    a positioning washer being mounted around the rotating shaft and having
        an abutting surface facing the inside surface of the holding wall of the sleeve; and
        two positioning recesses being formed in the abutting surface of the positioning washer and selectively engaging the positioning protrusions of the sleeve;
    multiple resilient washers being mounted around the rotating shaft and abutting the positioning washer; and
    a limiting ring being mounted around the rotating shaft and having
        an annular edge; and
        a limiting protrusion being formed transversely on the annular edge of the limiting ring and selectively abutting the limiting protrusion of the central frame.

20. The electronic device as claimed in claim 18, wherein the central frame of the tilting assembly has
    two guiding recesses being formed longitudinally in the first wall and communicating with the mounting hole of the central frame; and
    a limiting protrusion being formed on and protruding from the inside surface of the second wall of the central frame; and
the rotating assembly has
    a sleeve being hollow, being mounted rotatably around the rotating shaft, being mounted in the mounting hole of the central frame and having
        a sidewall;
        a connecting end;
        a holding wall being opposite to the connecting end, abutting the enlarged head of the rotating shaft and having an inside surface;
        a cavity;
        two guiding ears being formed transversely on the sidewall of the sleeve and respectively engaging the guiding recesses of the central frame; and
        two positioning protrusions being formed on the inside surface of the holding wall of the sleeve and protruding into the cavity;
    a positioning washer being mounted around the rotating shaft and having
        an abutting surface facing the inside surface of the holding wall of the sleeve; and
        two positioning recesses being formed in the abutting surface of the positioning washer and selectively engaging the positioning protrusions of the sleeve;
    multiple resilient washers being mounted around the rotating shaft and abutting the positioning washer; and
    a limiting ring being mounted around the rotating shaft and having
        an annular edge; and
        a limiting protrusion being formed transversely on the annular edge of the limiting ring and selectively abutting the limiting protrusion of the central frame.

* * * * *